3,253,009
HALOARYL SILANES
Thomas C. Allen, High Point, N.C., and Harold J. Watson, Danville, Va., assignors to Dan River Mills, Incorporated, Danville, Va., a corporation of Virginia
No Drawing. Filed Sept. 1, 1961, Ser. No. 135,446
8 Claims. (Cl. 260—448.8)

This invention relates to novel compositions of matter, novel textile treatments and novel treated textiles. In particular, the invention is directed to novel chemical compositions which, when applied to textiles, provide thereto a persistent resistance to bacteria and/or fungi.

The present invention has for its principal object the provision of novel compositions of matter which when contacted with water provide a lasting and sustained release of bactericide and/or fungicide.

Another object is the provision of novel compositions of matter which can be applied to textiles to impart thereto a persistent resistance to bacteria and/or fungi.

A further object is the provision of textile treating compositions which when applied to textiles will provide the above-mentioned advantages without altering the natural or customary appearance of the textile to which they are applied.

A still further object is the provision of textiles treated with novel textile compositions to provide thereto bactericidal and/or fungicidal effects which persist through multiple launderings.

Further objects and advantages of the invention will become apparent from the following detailed description.

In a broad aspect the novel compositions of this invention comprise the silicate esters of phenolic bactericides and fungicides. A silicate ester as described above is best fitted for treating textiles to impart long-lasting bactericidal and/or fungicidal effects which persist through multiple launderings when the molar ratio of reacted, phenolic bactericide or fungicide to silicon in the silicate ester is about 1.0 to about 2.5 and the molar ratio of silicon-bonded lower alkoxy groups to silicon is about 1.0 to about 3.0. Silicate esters containing less than 1.0 mole of reacted, phenolic bactericide or fungicide per mole of silicon or less than about 1.0 mole of silicon-bonded lower alkoxy groups per silicon atom are useful for other purposes, for example, in bags, in cartridges wherein a long sustained release of bactericide and/or fungicide upon immersion in water is desired although such silicate esters can be used in treating textiles, if a lower degree of bactericidal or fungicidal effect imparted to the textile is desired.

The silicate esters of this invention are advantageously formed by the replacement of one or more silicon-bonded alkoxy groups of a lower alkyl silicate ester with the organic oxy group of a bactericidal and/or fungicidal phenol formed by the removal of the hydroxy hydrogen. The silicate esters of this invention can also be formed by the replacement of alcoholyzable groups, e.g., silicon-bonded halogen atoms, amino groups, hydrogen (with chloroplatinic acid, sodium alkoxide, lithium alkoxide, hydrogen chloride, or zinc chloride catalysts), and the like, with the desired number per silicon atom of organic oxy groups of bactericidal and/or fungicidal phenol formed by the removal of the hydroxy hydrogen, and, if desired, any remaining silicon-bonded, alcoholyzable groups (e.g., halogen, amino, hydrogen, etc.) can be replaced with the desired number of lower alkoxy groups of lower alkanols. In this connection, it will be understood that the well known siloxanes containing alcoholyzable groups (e.g., alkoxy substituted siloxanes) will react in basically the same manner and can be employed in place of the alcoholyzable silane. Similarly, the silicate esters described and claimed herein also include the siloxanes resulting from the reaction of said phenol and siloxanes containing alcoholyzable groups, as well as those obtained by the hydrolysis and condensation of the silicate esters obtained by reacting the phenol with a silane containing alcoholyzable groups.

It has been found for the most part, that the silicon-bonded, organic oxy groups of the bactericidal and/or fungicidal phenol, as above described, hydrolyze at a very slow rate such that amounts of the phenolic bactericide or fungicide, from which the silicate ester is made, are released in a sustained manner upon contact with water. The rate of hydrolysis of a particular silicate ester (for example, after application to a textile) will depend upon the temperature and duration of water-immersion, washing, or laundering.

Typical bactericidal and/or fungicidal phenols include the halogen-substituted phenols, such as, pentachlorophenol; 2, 2'-methylene bis (3,4,6-trichlorophenol); tribromophenol; 4-chloro-3, 5-dimethylphenol; 2-chloro-4-phenylphenol; O-benzyl-p-chlorophenol; tetrachlorophenol; and the like, which halogen-substituted phenols are preferred, and phenols and hydrocarbon substituted phenols, such as phenol; o-phenyl-phenol; 2-methyl-5-isopropyl-phenol; beta-naphthol and the like. The hydrolyzable or alcoholyzable silanes and siloxanes include the organic orthosilicates such as tetraethyl orthosilicate, which because of ready availability is preferred, as well as the many types of organic- or hydrocarbon-substituted alcoholyzable silanes, i.e., alcoholyzable silanes and siloxanes having various other organic and hydrocarbon groups bonded to the silicon thereof.

In order to control hydrolysis, the reaction is carried out under substantially anhydrous conditions and advantageously can be conducted by refluxing the bactericidal and/or fungicidal phenol and the silane at ordinary pressures while withdrawing the alkanol, hydrogen halide, hydrogen, or ammonia (corresponding to the alcoholyzable group on the silane) formed as an adjunct to the replacement of the alcoholyzable groups on the silane with the organic oxy groups of the phenol. The adjunct (alkanol, hydrogen halide, hydrogen, or ammonia) thus formed is a convenient measure of the extent of reaction, indicating the number of silicon-bonded alcoholyzable groups which have been replaced by the organic oxy groups of the phenol starting material. When the desired number of such organic oxy groups have been bonded to the silane, the reaction is stopped and any suitable recovery means such as stripping, distillation, crystallization, extraction, and the like, can be employed, to the extent they are applicable, to recover and purify the silicate ester product. An advantageous procedure is to employ respective amounts of bactericidal and/or fungicidal phenol and alcoholyzable silane which are desired to be combined in the final reaction product. Thus, refluxing during the reaction can be employed to remove the alkanol, hydrogen halide, hydrogen, or ammonia formed as an adjunct leaving a substantially pure silicate ester product as residue so that no further recovery or purification steps would normally be necessary.

Silicate esters of this invention in the form of silanes include those represented by the formula

wherein R is a halogen-substituted aryl group; R' is a lower alkyl group or can be phenyl; R" is a monovalent organic group, for example, such as are present in the well known hydrocarbon-substituted or other organic-substituted silanes; $a$ is an integer from 1 to 4; $b$ is an integer from 0 to 3; and $a+b$ is not more than 4. Silicate esters which are adapted to application to cellulosic textiles for providing the surprising sterile effects herein described are those represented by the above formula wherein R represents aryl or halogen-substituted aryl; $a+b$ is not more than 3, preferably not more than 2; $a$ is 1 to 3; $b$ is 0 to 2, preferably 0 to 1; R' is alkyl and R" is as above described.

Silicate esters of this invention in the form of siloxanes include those containing the group represented by the formula

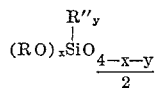

wherein R and R" are as defined above and $x$ is an integer from 1 to 3, $y$ is an integer from 0 to 2, and $x+y$ is an integer from 1 to 3. The siloxanes can contain only groups of the above formula, or they can also contain groups of the formula

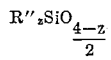

wherein $z$ is an integer from 1 to 3, chemically combined in the siloxane molecule with groups of said above formula. R, R", $x$, $y$ and $z$ need not be the same in the same molecule or in different molecules.

Any suitable method for applying the novel silicate esters to textiles, e.g., cellulosic textiles including cotton, mixtures of cotton with other textiles and modified cotton, can be employed. A particularly useful method is to pad the textile through an aqueous dispersion of the silicate ester using an emulsifier, for example, anionic, cationic or non-ionic emulsifiers, although any of the many other emulsifiers or dispersing agents suitable for applying finishes, sizes and modifiers to textiles can be employed. In addition to applying the silicate esters as aqueous dispersions, they can be applied as solutions in suitable solvents including water when such solubility is characteristic. In this connection it will be understood that the specific silicon-bonded, bactericidal and/or fungicidal organic oxy groups of the silicate esters are hydrolyzable at different rates and it will be a matter of choice by the operator as to whether an aqueous application system or a non-aqueous application system will be used. Thus, silicate esters containing the more easily hydrolyzable bactericidal and/or fungicidal organic oxy groups when applied from a non-aqueous medium tend to provide longer lasting effects than when applied from an aqueous medium. For special purposes the silicate esters can be applied in undiluted form, e.g., where a particularly heavy surface deposition is desired. In general, any technique for applying finishes, sizes or other fiber modifiers can be employed if allowed by the particular properties of a specific silicate ester.

After impregnation of the textile, as by padding operation, the impregnated textile is dried. In most cases air drying at ambient temperatures is adequate, although for rapid drying, heat and/or forced air can be employed. The usual after-treatments such as washing, resin treating, sizing, etc. can be applied, if desired, in order to provide special effects.

The resulting treated textile retains the natural appearance of the textile prior to treatment but is characterized by an anti-bacterial and/or anti-fungal effect. Additionally, contact with water provides a release of bactericide or fungicide from the textile which then operates to re-sterilize the textile. Surprisingly, the release of the bactericide and/or fungicide persists for long periods, withstands repeated launderings, and operates even after many launderings. Hard water has little or no effect on the release of the bactericide or fungicide and objectionable precipitation or curding of same does not take place.

The following examples are presented.

EXAMPLE I

Two moles of phenol and one mole of tetraethyl silicate with 0.5 gm. of silicon tetrachloride as catalyst were placed in a distilling flask with a fractionating column and a condenser. This mixture was then distilled with one mole of ethyl alcohol, boiling at 80° C., being collected. The reaction then stopped, so an additional 0.5 gm. of silicon tetrachloride was added. The second mole of ethyl alcohol then distilled over very rapidly. The reaction temperature ranged from 90° C. to 170° C. The residual product, diphenoxydiethoxysilane, was a reddish-brown liquid with a phenolic odor. An aqueous emulsion was prepared of the product employing Triton X-100 and was applied to cotton cloth in an amount of 3.6% of the product based on the dry weight of cloth. After drying, the treated cloth was tested against bacteria and fungus and the results are set forth in Table I below.

EXAMPLE II

One mole of o-phenylphenol and one-half mole of tetraethyl silicate with five grams of tetraisopropyl titanate as catalyst were then mixed and distilled. One mole of ethyl alcohol was collected in about thirty minutes with the reaction temperature ranging from 120 to 210° C. The residual product, di(o-phenylphenoxy) diethoxy silane, was a yellowish-brown liquid. An aqueous emulsion was prepared from the product employing Triton X-100 and was applied to cotton cloth in an amount of 3.6% of said silane based on the weight of the dry cloth. After drying the cloth was tested against bacteria and fungus and results are shown in Table I.

EXAMPLE III

One mole of hexachlorophene, 2,2'-methylene bis-(3,4,6-trichlorophenol), and one-half mole of tetraethyl silicate with 5 gm. tetraisopropyl titanate as catalyst were mixed and distilled following the procedure of Example I. One mole of ethyl alcohol was recovered in about fifteen minutes and the reaction temperature ranged from 120 to 170° C. The residual product was a brownish-red liquid. After about two months, the entire product was a hard, yellow solid. The product had the formula

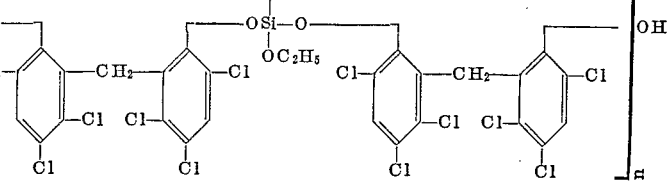

wherein $n$ is an integer of at least 1.

While still mostly liquid, the product was applied as an emulsion to cotton cloth in amounts of 1.2% and 2.0% of said product based on the dry weight of cloth by the procedure given in Example II. The water emulsion of the product was very yellow, leaving the cloth yellow. This color was easily washed out of the cloth, however. The washed cloth was dried and then tested against bacteria and fungus. The results are reported in Table I.

EXAMPLE IV

One mole of pentachlorophenol and one-half mole of tetraethyl silicate with 2.5 gm. tetraisopropyl titanate as catalyst were mixed and distilled according to the procedure of Example I. One mole of ethyl alcohol was recovered in about 30 minutes and the reaction temperature ranged from 110 to 210° C. The product, di(pentachlorophenoxy) diethoxysilane, solidified at about 100° C. This solid was emulsified by dissolving in dioxane with heat and then adding the solution to Triton X-100 and water. The product was applied as an emulsion to cotton cloth in an amount of 1.2% of said product based on the dry weight of the cloth. The results in Table I show that this product on cloth was extremely effective against bacteria and fungus.

The product was then applied to cloth in an amount of 2% and the cloth dried and tested for bactericidal and fungicidal action (Table I). The treated cloth was white, with no change in color after twenty hours exposure in the fadeometer.

EXAMPLE V

One mole of tribromophenol and one-half mole of tetraethyl silicate with five grams of tetraisopropyl titanate as catalyst were mixed and distilled according to the procedure of Example I. One mole of ethyl alcohol was recovered in 72 minutes and the reaction temperature ranged from 126 to 178° C. The product, di(tribromophenoxy) diethoxysilane, was a dark liquid which turned to a hard, grey solid on cooling to room temperature. This solid was then applied to cloth in water emulsion by the procedure of Example II in amounts of 6% and 1.2% of product based on the dry weight of cloth. This product was also applied to cloth from acetone solution in an amount of 4.5% of product based on the dry weight of the cloth and air-dried.

This product was made again using the same materials except only 1.5 gm. of catalyst. The final product was about the same as before but darker in color and not as hard. This product was applied to cloth at a concentration of 3% following the procedure of Example II.

All samples of cloth were tested against bacteria and fungus and the results are reported in Table I.

EXAMPLE VI

One mole of 4-chloro-3,5-dimethylphenol and one-half mole of tetraethyl silicate with five grams of tetraisopropyl titanate as catalyst were mixed and distilled following the procedure of Example I. One mole of ethyl alcohol was recovered as distillate in about one hour and the reaction temperature ranged from 97 to 200° C. The product was a dark red liquid which was applied to cloth in water emulsion following the procedure of Example II in an amount of 1.2% of product based on the dry weight of the cloth and in acetone in an amount of 3.0%. The treated cloth was dried and tested providing the results set forth in Table I.

EXAMPLE VII

One mole of 4-chloro-3-methylphenol and one-half mole of tetraethyl silicate with two grams of tetraisopropyl titanate were mixed and distilled according to the procedure of Example I. About one mole of ethyl alcohol was recovered as distillate in 45 minutes. One more gram of catalyst was added, but no more ethanol was recovered. The reaction temperature reached 235° C. The product, di(4-chloro-3-methylphenoxy) diethoxysilane, was a very dark liquid which was applied to cotton cloth as a water emulsion in the manner described in Example II in an amount of 6% of the product based on the dry weight of cloth. The treated cloth was then tested against bacteria and fungus and the results reported in Table I.

EXAMPLE VIII

Three-fourths mole of thymol and three-eighths mole of tetraethyl silicate with two grams of tetraisopropyl titanate as catalyst were mixed and distilled by the procedure of Example I. Exactly three-fourths mole of ethyl alcohol was recovered in about 75 minutes. An extra two grams of catalyst were added but no further reaction took place. The reaction temperature ranged from 110 to 180° C. The product, di(2-methyl-5-isopropylphenoxy) diethoxysilane, was a dark yellow-brown liquid with a strong odor of thymol. This product was then applied to cotton cloth as a water emulsion in the manner of Example II in an amount 1.2% of the product based on the dry weight of cloth. The treated cloth had a strong odor of thymol after five home launderings in a Bendix automatic washer. This cloth was then tested against bacteria and fungus and the results reported in Table I.

EXAMPLE IX

One mole of 2-chloro-4-phenylphenol and one-half mole of tetraethyl silicate with three grams of tetraisopropyl titanate as catalyst were mixed and distilled according to the procedure of Example I. About eight-tenths of one mole of ethyl alcohol was recovered in one hour. An extra two grams of catalyst was added but no further reaction took place. The product, di(2-chloro-4-phenylphenoxy) diethoxysilane, was a very dark liquid which was applied to cotton cloth as a water emulsion in the manner of Example II in an amount of 1.2% of product based on the dry weight of cloth. The treated cloth was then tested against bacteria and fungus and the results reported in Table I.

EXAMPLE X

One-half mole of o-benzyl-p-chlorophenol and one-fourth mole of tetraethyl silicate with two grams of tetraisopropyl titanate as catalyst were mixed and distilled according to the procedure of Example I. About one-half mole of ethyl alcohol was recovered as distillate in about 30 minutes. The reaction temperature ranged from 117 to 200° C. The product, di(o-benzyl-p-chlorophenoxy) diethoxysilane, was a dark liquid. The product was then applied to cloth as a water emulsion in the manner of Example II in an amount 6% of the product based on the dry weight of cloth. The treated cloth was then tested against fungus and bacteria and the results recorded in Table I.

*Table I*

| Ex. | Percent Silicate Ester on Cloth | No. of Washes | Fungicidal Action | Bactericidal Action |
|---|---|---|---|---|
| I | 3.6 | 0 Bx | 1-2 | 5 |
|  | 3.6 | 1 Bx | 2-3 | 5 |
|  | 3.6 | 5 Bx | 3 | 5 |
| II | 3.6 | 0 Bx | 1-3 | 5 |
|  | 3.6 | 1 Bx | 2-3 | 5 |
|  | 3.6 | 5 Bx | 3 | 5 |
| III | 1.2 | 0 Bx | 3 | 5 |
|  | 1.2 | 1 Bx | 3 | 5 |
|  | 1.2 | 5 Bx | 3 | 5 |
|  | 2.0 | 1 CW | 3 | 5 |
|  | 2.0 | 5 CW | 3 | 5 |
|  | 2.0 | 10 CW | 3 | 5 |
| IV | 1.2 | 0 Bx | 2 | 5 |
|  | 1.2 | 1 Bx | 2 | 5 |
|  | 1.2 | 5 Bx | 2 | 5 |
|  | 2.0 | 1 CW | 3 | 5 |
|  | 2.0 | 5 CW | 3 | 5 |
|  | 2.0 | 10 CW | 3 | 5 |
| V | 1.2 | 0 Bx | 1 | 5 |
|  | 1.2 | 1 Bx | 3 | 5 |
|  | 1.2 | 5 Bx | 3 | 5 |
|  | 6.0 | 0 Bx | 1 | 5 |
|  | 6.0 | 1 Bx | 2-3 | 5 |
|  | 6.0 | 5 Bx | 2-3 | 5 |
|  | 4.5 | 0 Bx | 3 | 5 |
|  | 4.5 | 1 Bx | 3 | 5 |
|  | 4.5 | 5 Bx | 3 | 5 |
| VI | 1.2 | 0 Bx | 3 | 5 |
|  | 1.2 | 1 Bx | 3 | 5 |
|  | 1.2 | 5 Bx | 3 | 5 |
|  | 3.0 | 0 Bx | 1 | 5 |
|  | 3.0 | 1 Bx | 3 | 5 |
|  | 3.0 | 5 Bx | 3 | 5 |
| VII | 6.0 | 0 Bx | 2 | 5 |
|  | 6.0 | 1 Bx | 3 | 5 |
|  | 6.0 | 5 Bx | 3 | 5 |
| VIII | 1.2 | 0 Bx | 3 | 5 |
|  | 1.2 | 1 Bx | 3 | 5 |
|  | 1.2 | 5 Bx | 3 | 5 |
| IX | 1.2 | 0 Bx | 3 | 5 |
|  | 1.2 | 1 Bx | 3 | 5 |
|  | 1.2 | 5 Bx | 3 | 4-5 |
| X | 6.0 | 0 Bx | 1 | 5 |
|  | 6.0 | 1 Bx | 1 | 5 |
|  | 6.0 | 5 Bx | 2 | 5 |

In Table I, the designation "Bx" indicates the number of washes in a Bendix automatic washer under normal home conditions (at a wash temperature of about 140° F. and using "All" detergent manufactured by Monsanto Chemical Company) and the designation "CW" indicates the number of commercial washes.

The fungicidal tests were carried out with *Aspergillus niger*, ATCC 6275, incubated for seven to eight days at 30° C., on Difco Sabouraud Dextrose Agar. The samples of treated cloth employed measured ½ by 1 inch and were placed on the growing culture. After seven to eight days, observations were made and results recorded in Table I on the scale of:

(1) Indicates growth inhibition on the cloth with a halo of non-growth around the cloth.

(2) Indicates growth inhibition on the cloth without a halo of non-growth.

(3) Indicates growth on the fabric.

The bactericidal tests were carried out with *Micrococcus pyogenes* var. *aureus* (*Staphylococcus aureus*), ATCC 6538, maintained in Difco Bacto Nutrient Broth, transfers being made daily during the test period in a manner which aided in providing a more uniform concentration of the bacteria in successive tests. The bacteria inoculum was applied to Difco Bacto AATCC Bacteriostasis Agar plates in five parallel streaks about three inches long and ¼ inch apart made with platinum loop (2 mm. inside diameter) filled with inoculum. Cloth samples, ½ by 1 inch, were pressed onto the streaks, assuring complete contact of the cloth and agar, and the agar plates with applied cloth were incubated at 37° C. for twenty-four hours. Evaluations were then made by counting the number of streaks obliterated. Bactericidal action is recorded in Table I as the number of streaks obliterated.

What is claimed is:

1. Compositions of matter having the formula:

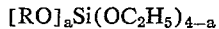

wherein R is a group from the class consisting of tribromophenyl, pentachlorophenyl, 4-chloro-3-methylphenyl, 2-chloro-4-phenylphenyl, o-benzyl-p-chlorophenyl, and 4-chloro-3,5-dimethylphenyl and $a$ is an integer from 1 to 3.

2. Di(pentachlorophenoxy) diethoxysilane.
3. Di(tribromophenoxy) diethoxysilane.
4. Di(4-chloro-3-methylphenoxy) diethoxysilane.
5. Di(4-chloro-3,5-dimethylphenoxy) diethoxysilane.
6. Di(2-chloro-4-phenylphenoxy) diethoxysilane.
7. Di(o-benzyl-p-chlorophenoxy) diethoxysilane.
8. A compound of the formula:

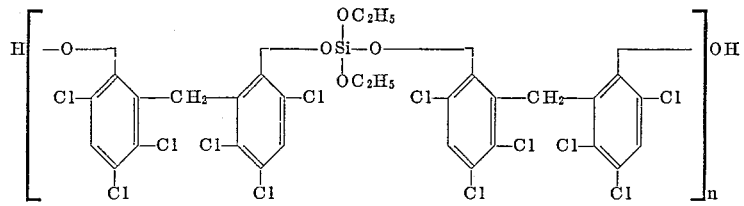

wherein $n$ is an integer of at least one.

References Cited by the Examiner

UNITED STATES PATENTS

| | | | |
|---|---|---|---|
| 2,242,400 | 5/1941 | Loane et al. | 260—448.8 |
| 2,370,378 | 2/1945 | Swanson | 167—38.6 |
| 2,584,334 | 2/1952 | Fano | 260—448.8 |
| 2,611,778 | 9/1952 | Speier | 260—448.8 |
| 2,641,581 | 6/1953 | Da Fano | 260—448.8 |
| 2,643,263 | 6/1953 | Morgan | 260—448.8 |
| 2,673,870 | 3/1954 | Johns | 260—448.8 |
| 2,695,858 | 11/1954 | Lisle | 167—38.6 |
| 2,724,698 | 11/1955 | Kittleson | 260—448.8 |
| 2,744,878 | 5/1956 | Smith-Johannsen | 260—448.8 |
| 3,042,657 | 7/1962 | Dodgson | 260—448.8 |

FOREIGN PATENTS 572,101  3/1959  Currie.

OTHER REFERENCES

Speier: Jour. American Chemical Soc., vol. 74, February 1952, pages 1003–1010.

TOBIAS E. LEVOW, *Primary Examiner*.

MORRIS WOLFE, SAMUEL BLECH, *Examiners*.